INVENTORS
GUY H. MOATES
JOHN K. KENNEDY
BY Harry A. Herbert Jr
Sherman H. Goldman
ATTORNEYS INVENTORS
GUY H. MOATES
JOHN K. KENNEDY
BY Harry A. Herbert Jr
Sherman H. Goldman
ATTORNEYS

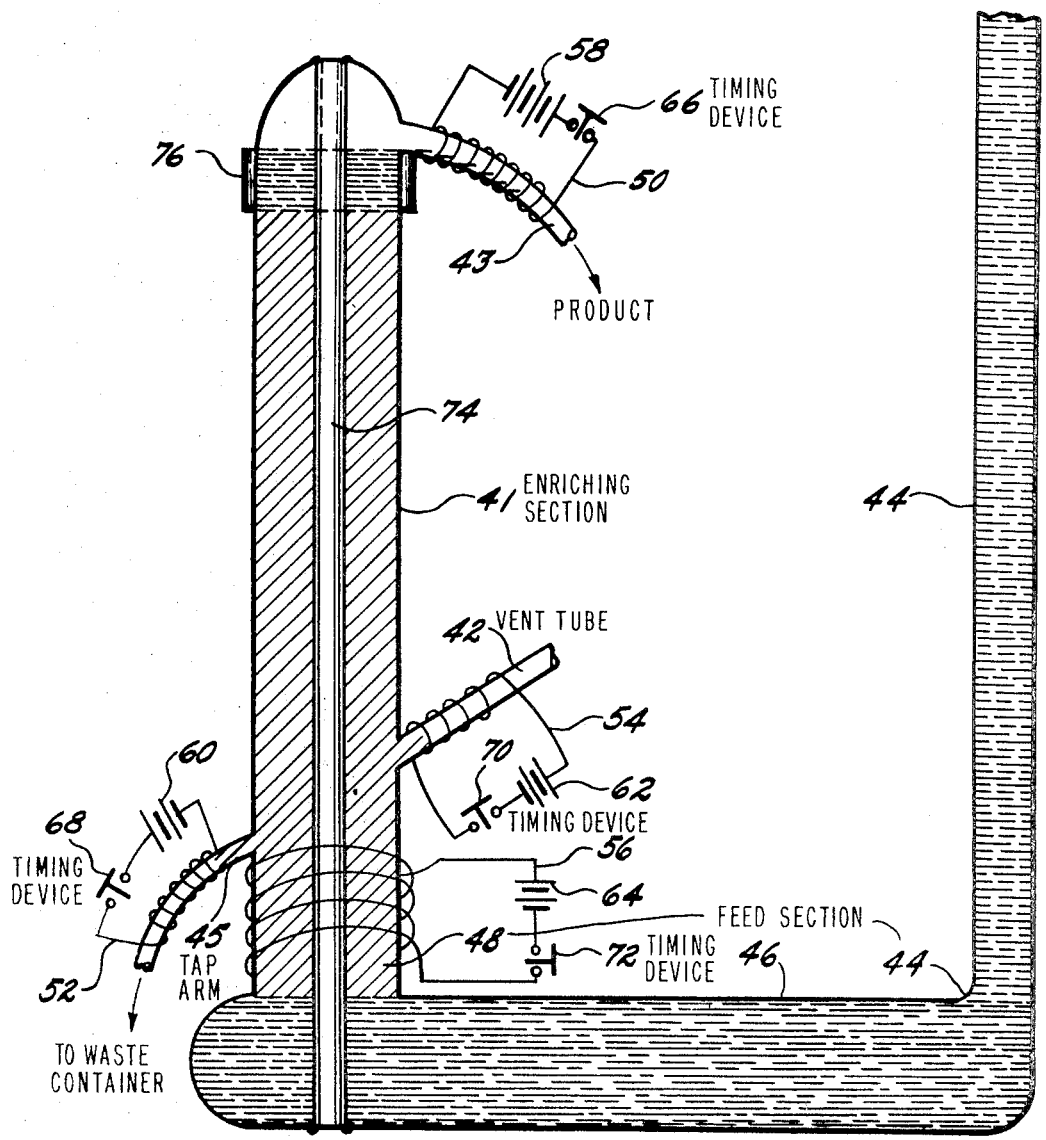

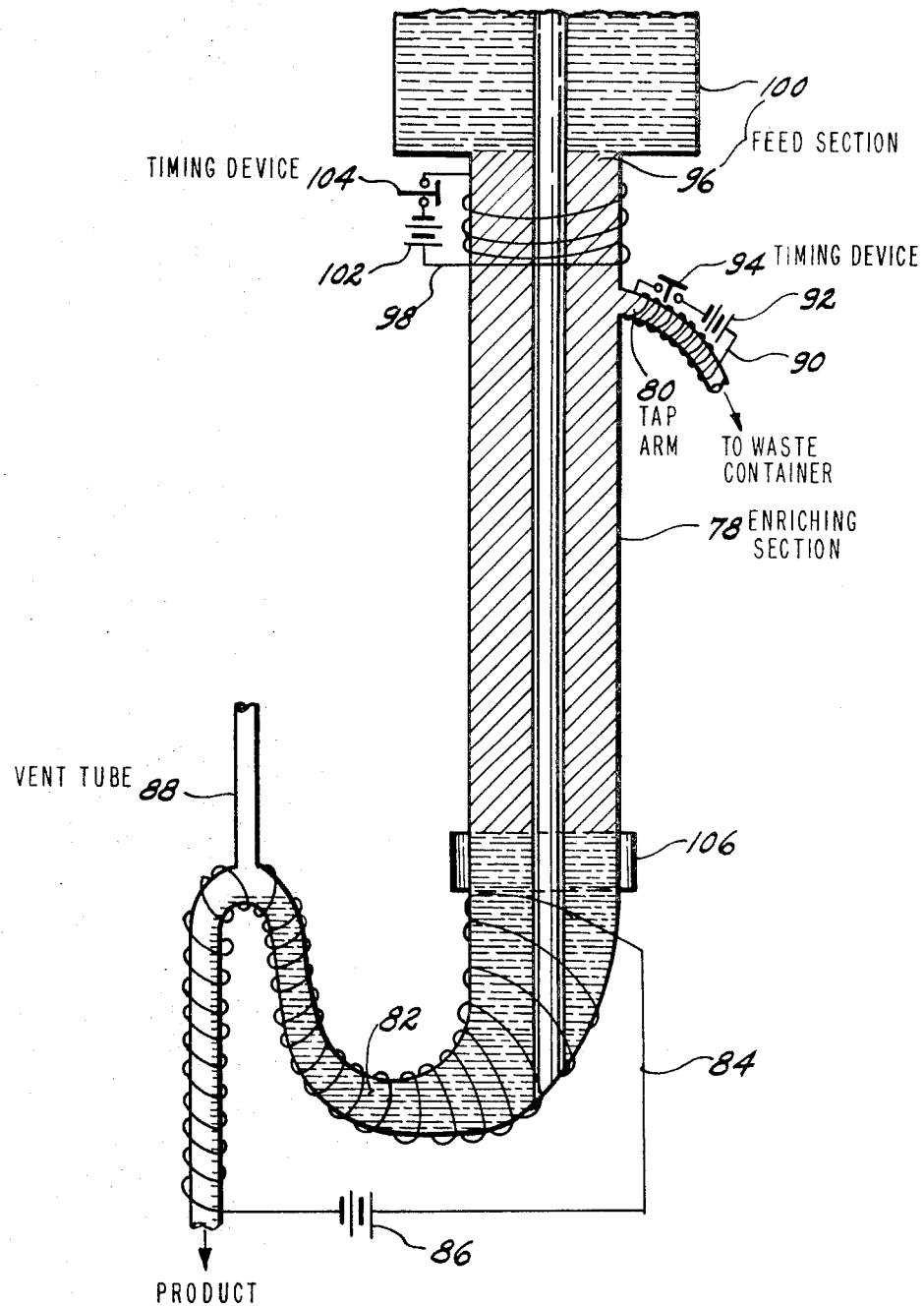

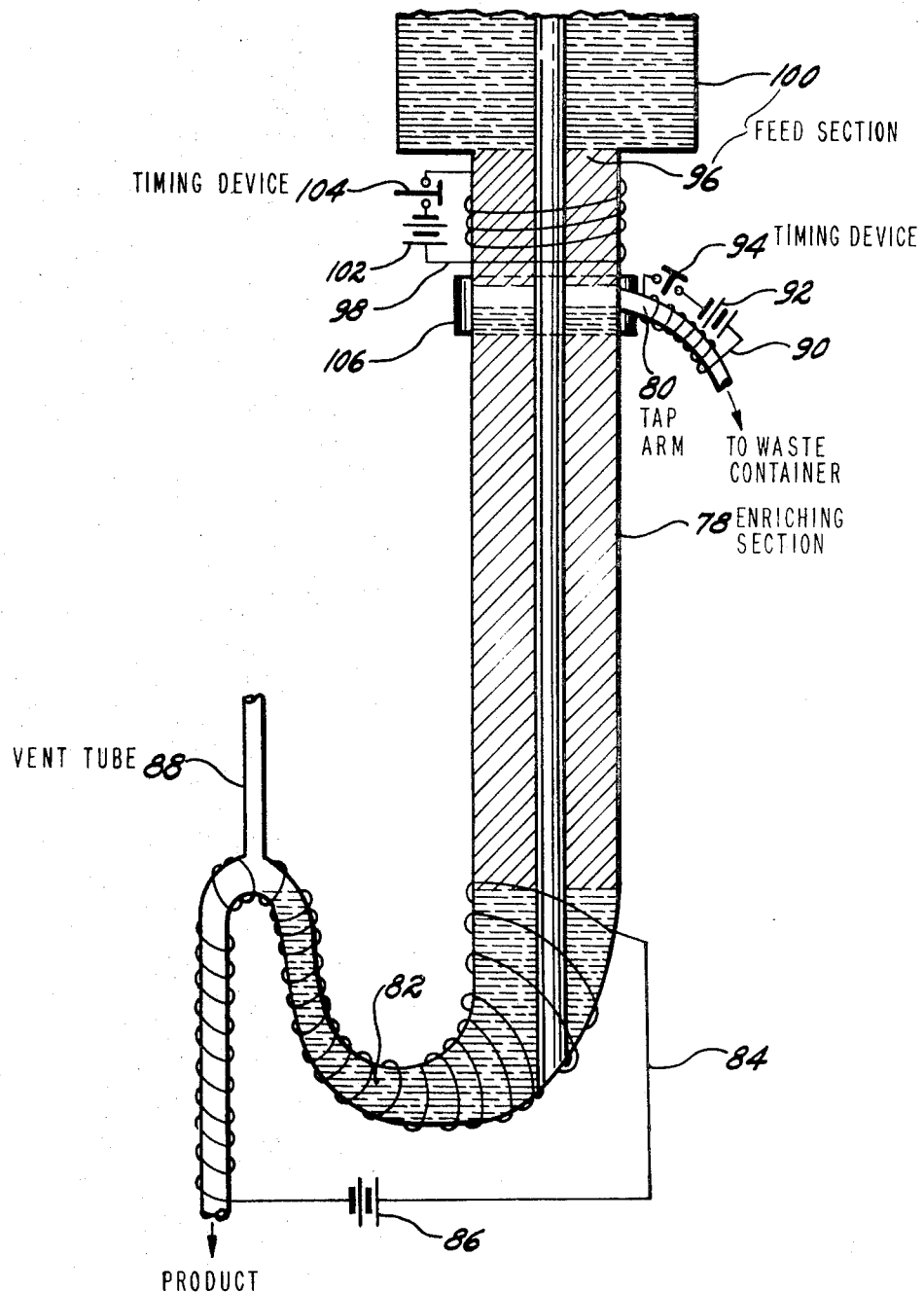

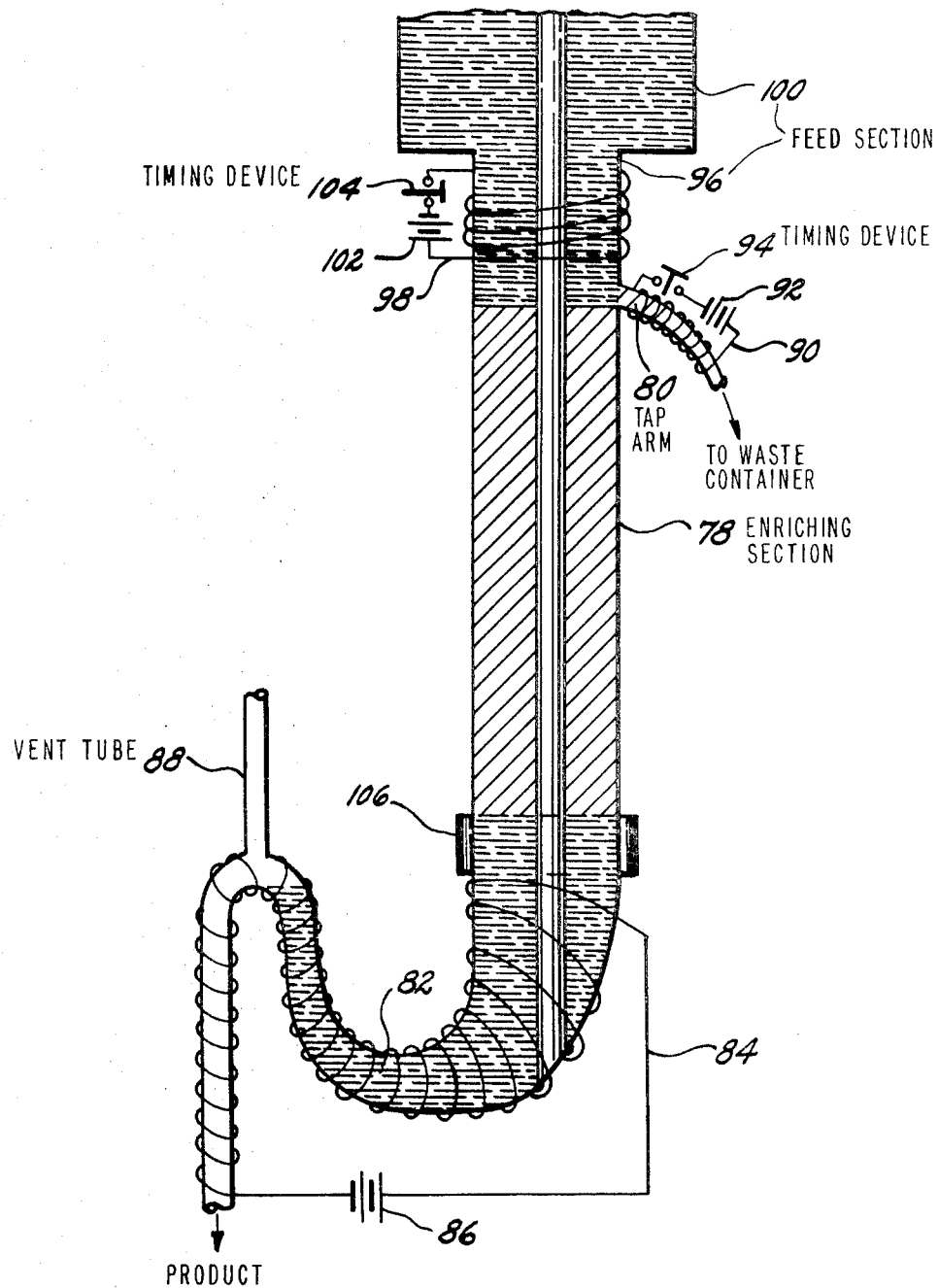

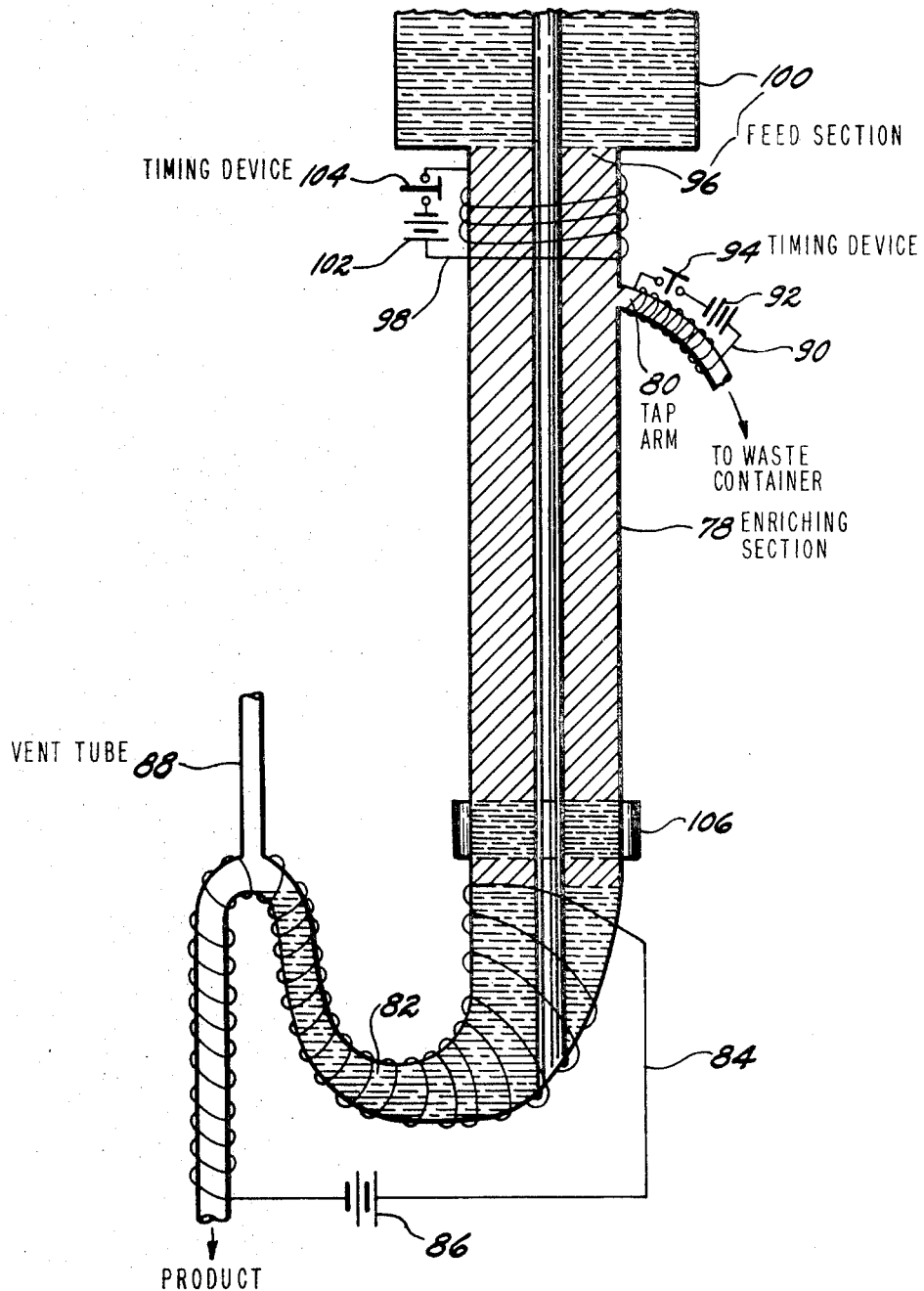

United States Patent Office 3,519,393
Patented July 7, 1970

3,519,393
CONTINUOUS SINGLE COLUMN MATTER TRANSPORT ZONE REFINING APPARATUS
Guy H. Moates, Lexington, and John K. Kennedy, Boston, Mass., assignors to the United States of America as represented by the Secretary of the Air Force
Filed Dec. 6, 1966, Ser. No. 600,001
Int. Cl. B01j 17/14
U.S. Cl. 23—273                                      8 Claims

ABSTRACT OF THE DISCLOSURE

A continuous zone refining system having an enriching section which utilizes matter transport for the movement of material and eliminates the conventional stripping section by providing a tap arm at the end of the enriching section which joins a feed section. A timing means selectively controls heating of the feed section and top arm.

---

The invention described herein may be manufactured and used by or for the United States Government for governmental purposes without payment to us of any royalty thereon.

This invention relates generally to a continuous zone refining system and, more particularly, to one in which the stripping section is eliminated and matter transport is utilized to produce material flow in the enriching section.

Previously, zone refining apparatus utilized a stripping section and an enriching section together with a feed. By eliminating the stripping section requirement there is eliminated the mixing problem which normally occurs at the junction of the feed section with both the enriching and stripping sections. The apparatus of this invention is capable of operation either vertically or horizontally and can be utilized for purification of either inorganic or organic materials.

Accordingly, it is a primary object of this invention to provide a continuous zone refining system wherein the stripping section is eliminated.

It is another object of this invention to provide a continuous zone refining system which utilizes the matter transport phenomenon to produce material flow in the enriching section.

It is still another object of this invention to provide a continuous zone refining system which may be operated either vertically or horizontally.

It is a further object of this invention to provide a zone refining system which eliminates mixing problems which would normally occur at the junction of a feed section with the enriching and stripping sections of prior art devices.

Another object of this invention involves the provision of a continuous zone refining system which reduces the effect of back reflection of solute from the impure end.

Still another object of this invention involves the provision of a continuous zone refining system which allows for the preparation of ultra-pure organic or inorganic materials.

A further object of this invention involves the provision of a continuous zone refining system which utilizes conventional, currently available materials which lend themselves to standard mass production manufacturing techniques.

These and other advantages, features and objects of the invention will become more apparent from the following description taken in connection with the illustrative embodiments in the accompanying drawings, wherein:

FIGS. 4–7 are schematic representations of an alternate embodiment which utilizes vertical positioning of the enriching section with descending zones; and FIGS. 8–11 schematically illustrate an apparatus operating in the vertical position with upwardly moving zones.

In order to avoid the contamination of feed material by solute from the enriching section, the previously utilized continuous zone refining systems required a balance from the stripping section to compensate for the solute added to the feed from the enriching section. In the system of this invention the solute which normally would be injected into the feed section by the molten zone action of the enriching section is removed before it can mix with and/or contaminate the feed. Operation, therefore, is simplified by eliminating the stripping section and the stirring mechanism which are required to maintain constant solute concentration in the feed. In the instant invention constant solute concentration is a reality and the calculations based thereon more closely approach the theoretical. Additionally, the reduction of back reflection of solute from the impure end of the enriching section enables increased purity of the product and a decrease in the number of passes required to attain the steady state.

To simplify description the following assumptions are made, although they are not intended to limit the scope of the invention. (1) The system undergoing treatment is an ideal binary solute-solvent system. (2) The solute is the impurity to be separated. (3) The distribution coefficient, $k$, is constant and less than one. (4) The material being refined is more dense as a solid than as a liquid.

Figure 1:
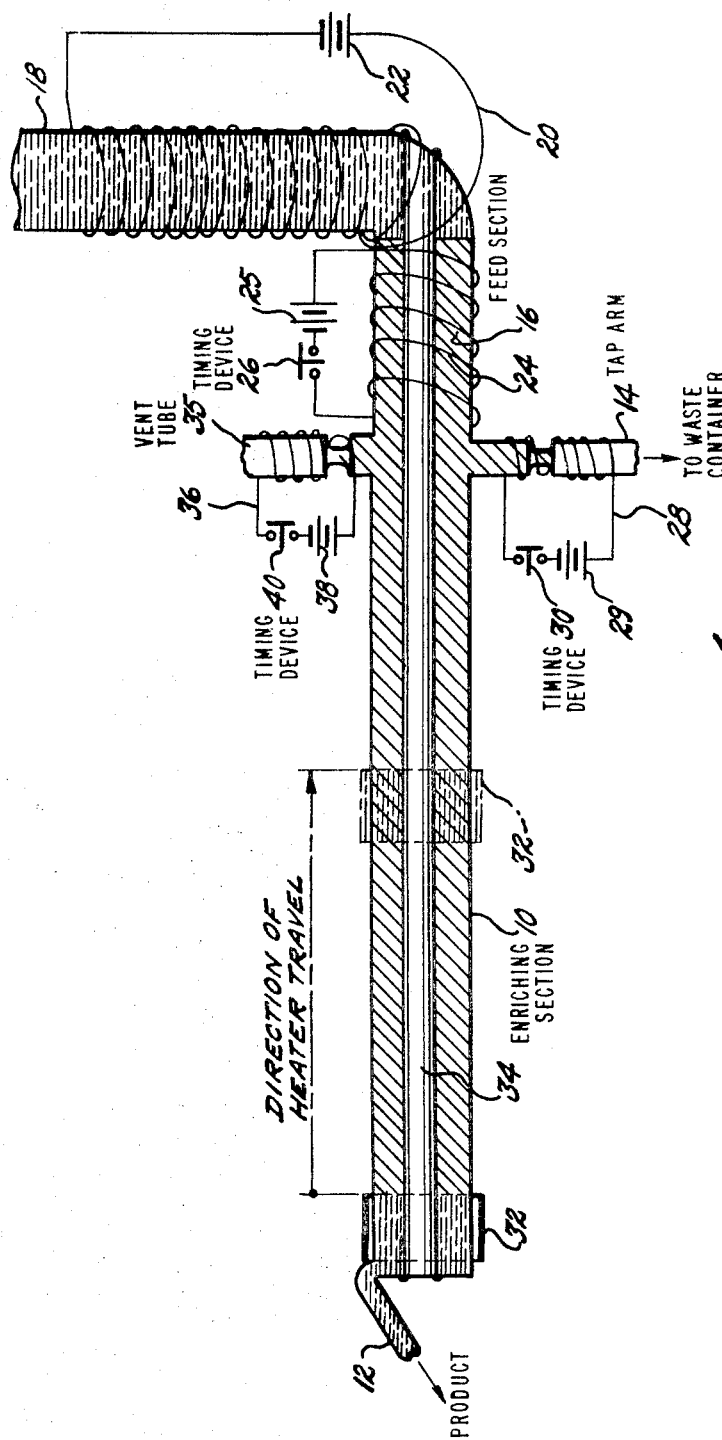
FIGS. 1–3 are schematic representations of a horizontally operated continuous zone refining system which eliminates the need for a stripping section; the separate figures illustrating the various heater positions and operation of the tap arm and feed heaters.
Figure 2:
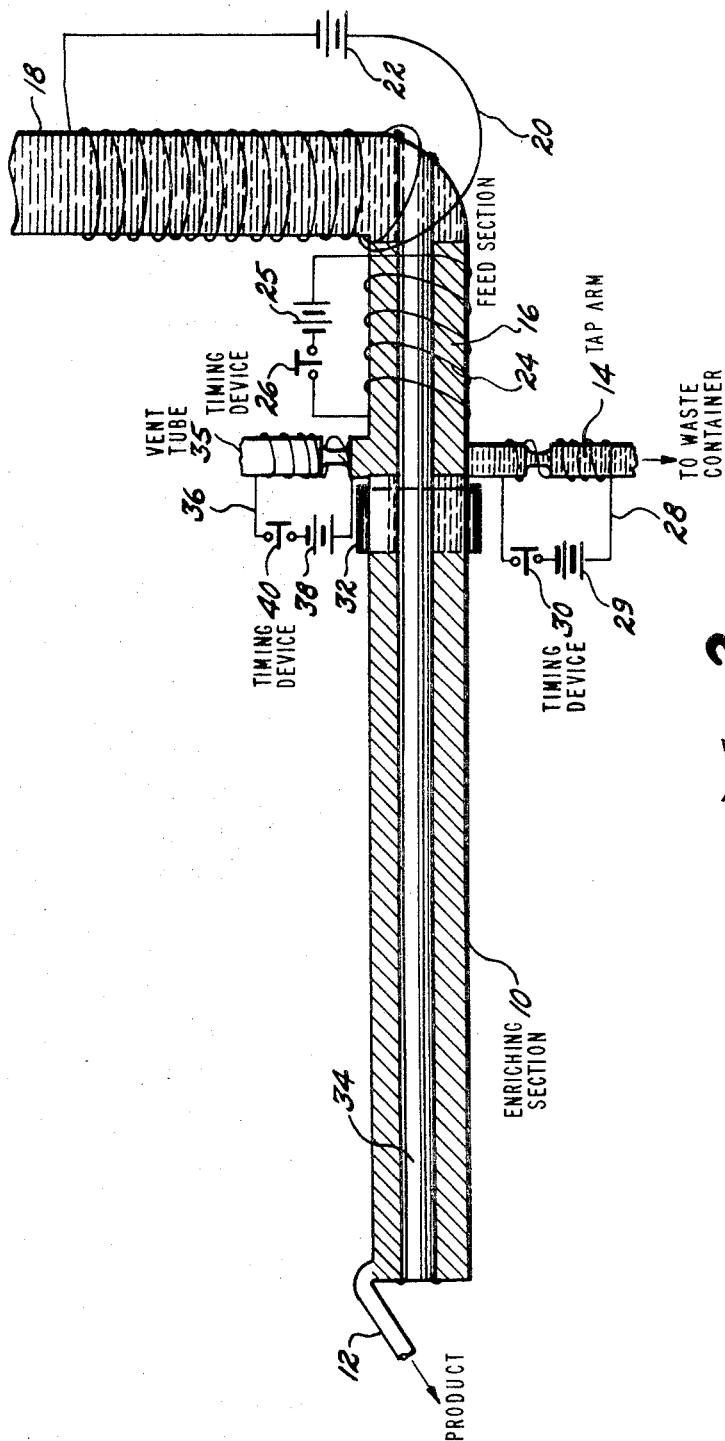
Figure 3:
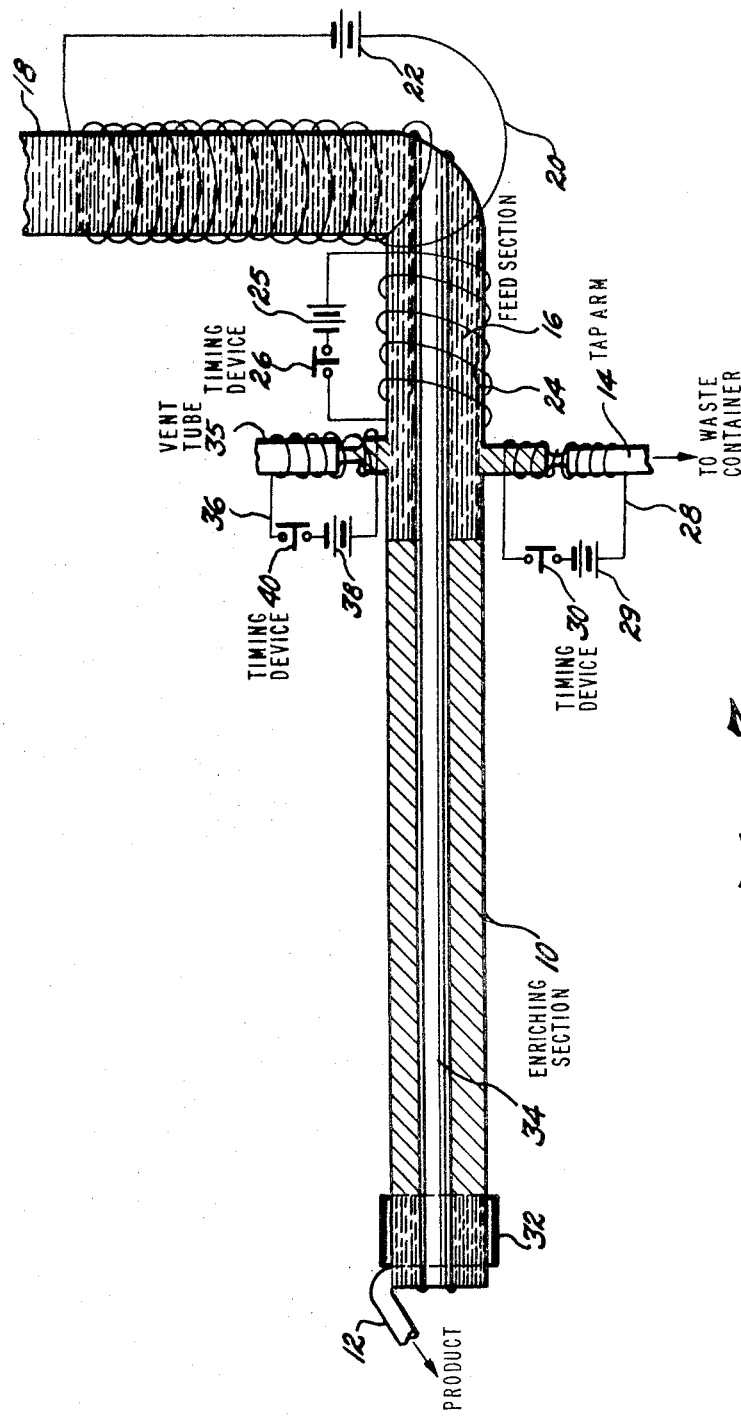

A schematic representation of an apparatus of this type which operates in the horizontal position is shown in FIGS. 1, 2 and 3. Referring to FIG. 1, there is shown an apparatus comprising an horizontal enriching section 10 and a feed section 16, 18. The enriching section 10 is located between the product exit 12 and the tap arm 14, which allows the last zone length of material to be removed from the enriching section at the end of each pass. The feed section comprises an horizontal segment 16 and a vertical segment 18. The horizontal segment 16 extends from the tap arm 14 to the vertical segment 18. The vertical segment 18 of the feed system, through which feed enters the system, is connected at its upper end to a suitable, constant supply of feed material, not shown. The feed material in the vertical segment 18 is maintained in the molten state by a conventional heating coil 20, which is connected to a suitable power supply represented schematically at 22. The horizontal segment 16 of the feed section contains feed material which is normally in the solid state; however, this material is made molten by the conventional coil heater 24 powered by a conventional power supply 25, which is turned on at the appropriate time by the action of the timing device 26.

Material in the tap arm 14 is also normally solid. The coil heater 28 is powered by a conventional power supply 29, and when activated by the timer 30, is used to melt material in the tap arm 14 as required.

Molten zones are caused to travel slowly through the enriching section 10 by means of the moving heater 32. The enriching section 10 contains a concentric hollow tube 34 for aiding in obtaining solid liquid interfaces. A vent tube 35 is provided which allows a molten zone to flow smoothly through the tap arm 14. The vent tube 35 can be heated by a conventional coil heater 36 which is powered by a conventional power supply 38 when activated by the timer 40.

The segments 10, 16 and 18 are filled with material to be refined, and it is assumed that the material in these segments is of unit cross section. After the level of the solid material in the enriching section 10 is of a height equal to the bottom of the overflow portion of product side arm 12, a sufficient number of zones are progressed through the system to attain a steady state. With the parameters of $k$ as previously indicated, the direction of zone travel is from left to right with the molten zone regenerating the bar at unit cross section.

The heater 32 takes up its position on the left end of the enriching section 10 creating a molten zone of weight $l$. The solid portions are shown with diagonal cross hatching while liquid, molten material has horizontal, dashed cross hatching. The material expands when melted thereby causing an overflowing into the product side arm 12 for collection as product in a suitable container, not shown. The molten zone, which is of unit cross section, is moved through the enriching section toward the tap arm 14, an intermediate position being shown in phantom in FIG. 1. When the molten zone reaches the tap arm 14, as indicated in FIG. 2, the heater coils 28 and 36 are activated by the timers 30 and 40, melting the solid in the tap arm and the vent tube causing the molten zone to drain through the tap arm into a suitable waste container, not shown. The heaters 28 and 36 are then deactivated by the timers 30 and 40, thereby allowing the tap and vent arms 14 and 35 to cool while the moving heater 32 returns rapidly to its starting position. The heater 24 is then activated by the timer 26 causing the material in the horizontal segment 16 to melt and flow into the tap and vent arms where it freezes in order to create solid plugs. The entire feed section is then in the molten state and fills the empty portions of segments 10 and 16 with molten material as shown in FIG. 3. The heater 24 is then deactivated by the timer 26 and the system is returned to the conditions shown in solid lines in FIG. 1.

Figure 4:
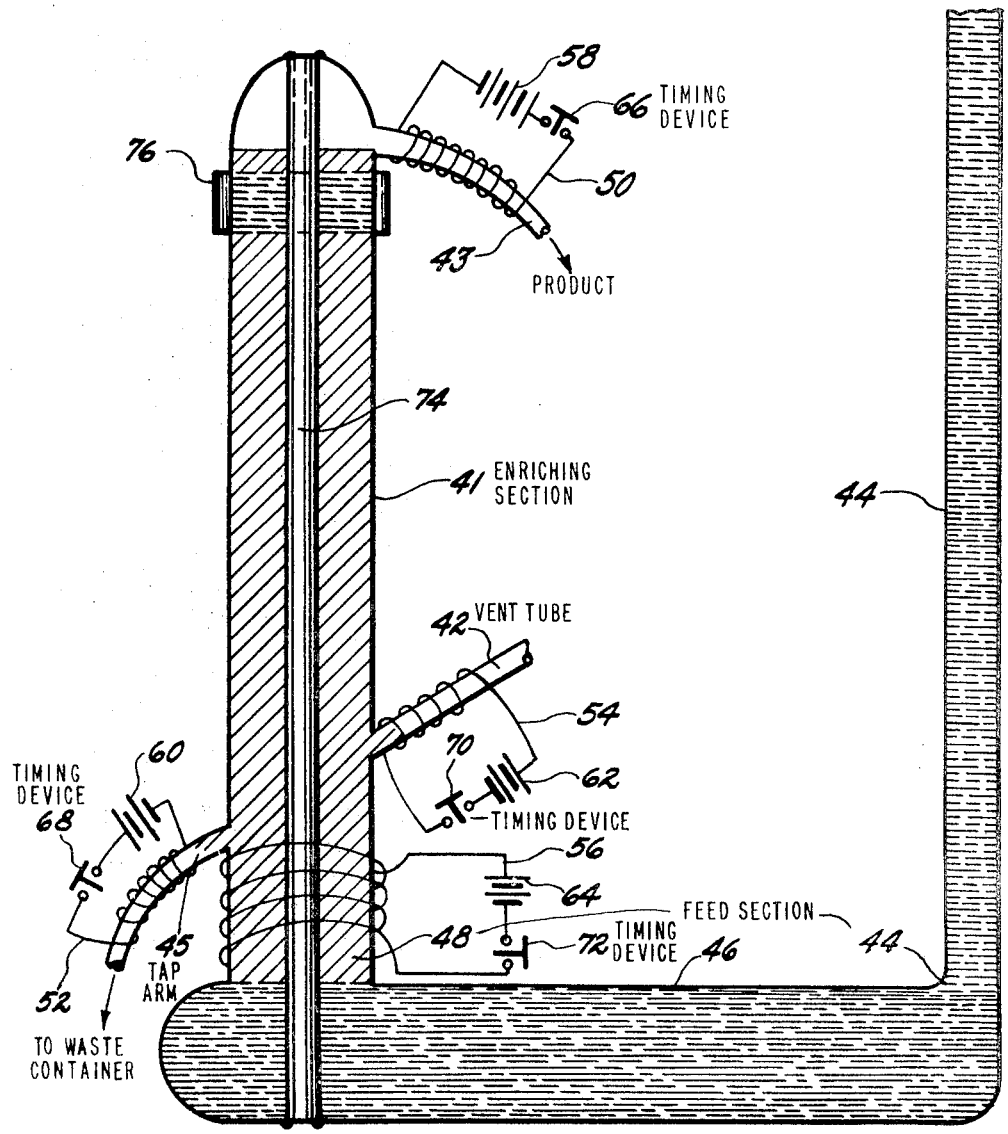

A second embodiment of this invention is one which operates in the vertical position with descending zones as shown schematically in FIGS. 4, 5, 6 and 7. As shown in FIG. 4, the enriching section 41 is located between the product exit 43 and the tap arm 45. One molten zone length above the tap arm is a vent tube 42, which prevents a partial vacuum from being formed in the enriching arm when the last liquid zone is drained from the enriching column via the tap arm 45.

The feed section comprises the vertical segment 44, the horizontal segment 46, and the vertical segment 48, which extends from the horizontal arm 46 to the tap arm 45. The arms 43, 45 and 42 and the segment 48 are wrapped, respectively, with heating coils 50, 52, 54 and 56, which in turn are powered by conventional power supplies 58, 60, 62 and 64 and are activated at the appropriate time by their respective timers 66, 68, 70 and 72. The material in the horizontal segment 46, and the vertical segment 44, is maintained in the molten state by a heater, not shown, and is supplied as needed from any conventional source which is also not shown. The hollow tube 74 aids in obtaining planar solid-liquid interfaces.

After a large number of passes have been put through the apparatus such that the steady state has been obtained, and assuming the material in the enriching section to be of unit cross section, the operation of the apparatus can be described by referring to FIGS. 4 through 7.

Thus, in FIG. 4, the moving heater 76 has just reciprocated and started on its downward path to create a molten zone as shown. Since the density of the solid is greater than the density of the liquid, the material expands on melting, and when the heater was at its highest point, the material overflows into the product exit 43, which has been heated by the heater 50. The material that overflows is collected as product in a suitable container, not shown.

Figure 5:
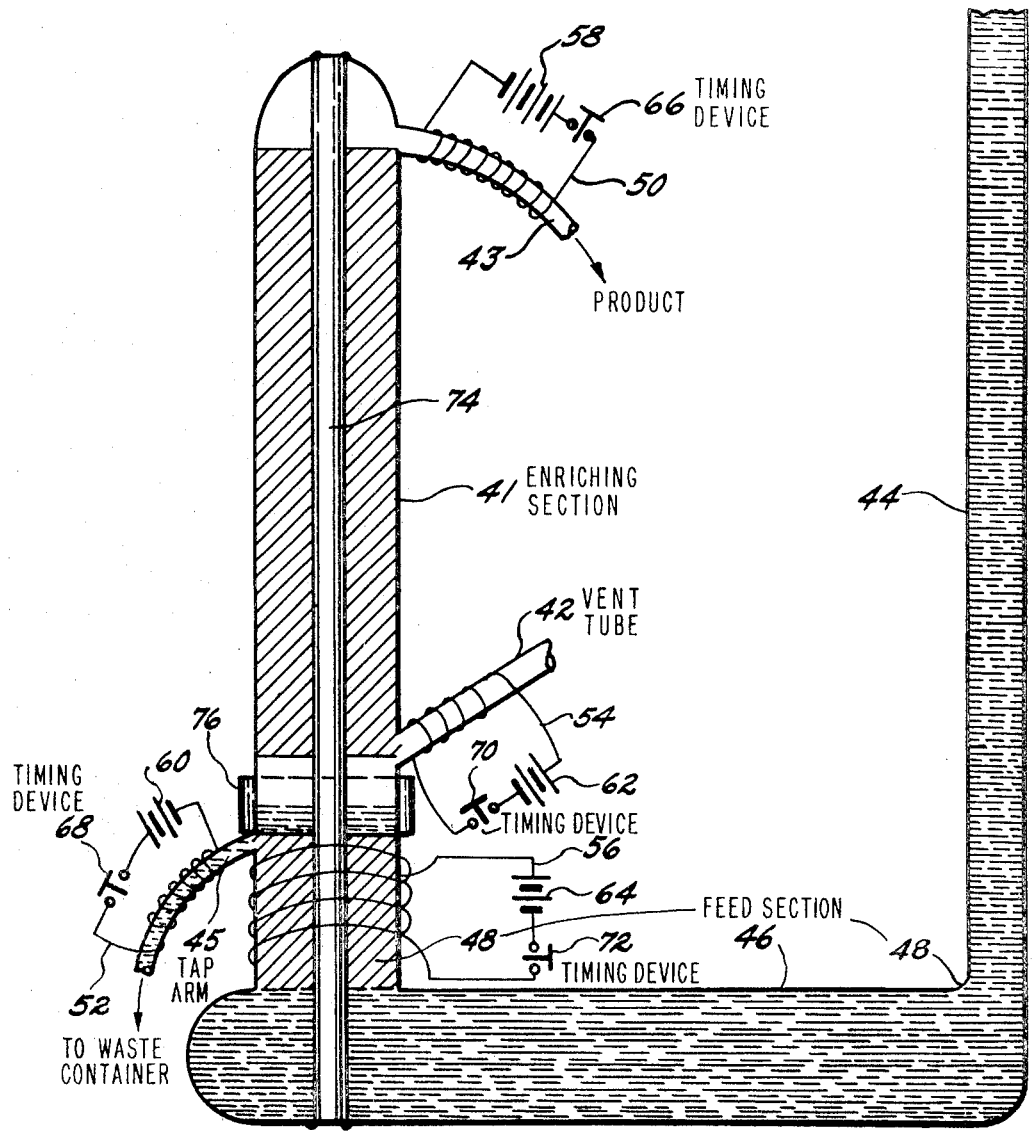

As shown in FIG. 5, the moving heater 76 travels slowly along the enriching section 41 until it reaches the tap arm 45, a slot in the heater allowing passage by vent arm 42. Before the zone reaches the tap arm, the heaters 52 and 54 are activated by the timers 68 and 70, respectively. These heaters melt the solid material which blocks the tap and vent arms. When the molten zone reaches the tap arm 45, the entire zone plus the material in the tap and vent arms flows through the tap arm 45 into a waste container, not shown. Flow of material in the molten zone is assured by the vent arm 42, which is connected to a source of inert gas not shown.

Figure 6:
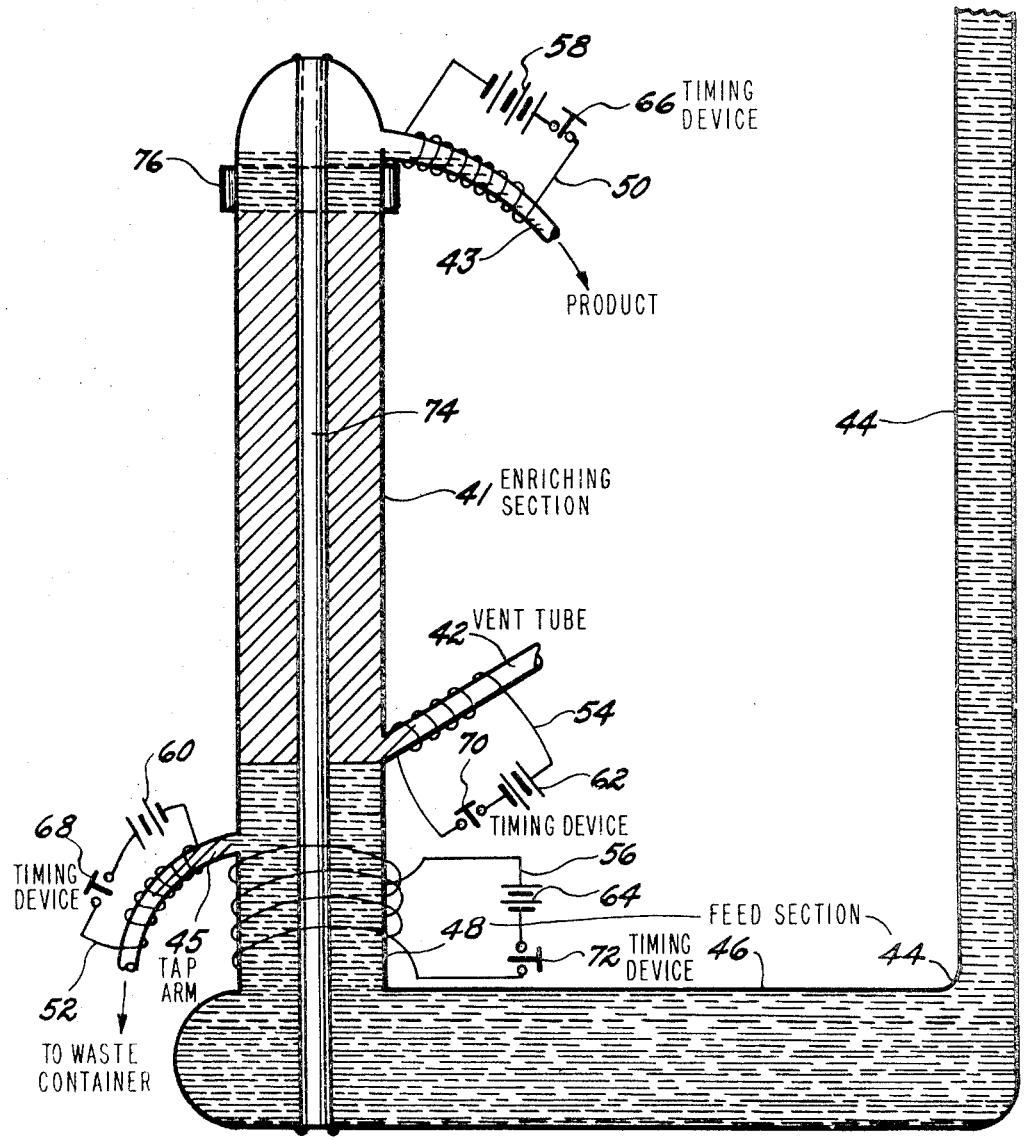

The moving heater 76 then reciprocates and starts another cycle as shown in FIG. 6. The heaters 52 and 54 are deactivated by the timers 68 and 72 and the tap arm and the vent arm cool. Heater 56 is then activated by timer 72 and melts the solid material in the vertical segment 48. The liquid feed material fills the column as shown in FIG. 6. The heater 56 is then shut off by the timer 72, allowing the material in the vertical segment 48 to solidify completing the cycle as shown in FIG. 7.

The third embodiment of this invention is shown schematically in FIGS. 8, 9, 10 and 11. This apparatus operates in the vertical position with the molten zones moving up. As shown in FIG. 8, the enriching section 78 is located between the tap arm 80 and the product exit section 82. Material in the product exit section is maintained molten by the conventional coil heater 84 which is powered by a conventional power supply 86. The vent tube 88, which is connected to a source of inert gas (not shown) insures smooth flow of product down the exit to a suitable product container (not shown). The tap arm 80 is wrapped with a heating coil 90 which is powered by a conventional power source 92 which can be activated by the timer 94.

The feed section is composed of the segment 96 which can be heated by the heating coil 98 and a section of larger diameter 100 containing material maintained molten by a conventional coil heater, which is not shown. The section 100 is kept full of the material to be refined by conventional means, not shown. The heating coil 98 is powered by a conventional power source 102 which can be activated by the timer 104.

The operation of this apparatus can be described by reference firstly to FIG. 8. After a large number of passes have been put through the system such that a steady state has been achieved, it is assumed that the material in the enriching section is of unit cross section. At the start of a pass the moving heater 106 has just reciprocated and melts a zone causing material to overflow the inverted U-tube in section 82. This material is collected as product. The moving heater then travels slowly up the enriching section. When the molten zone reaches the tap arm 80 as shown in FIG. 9, the liquid material in the zone flows down the tap arm into a waste container. The melting interface of the molten zone advances into the vertical segment of the feed section 96 melting feed material down into the molten zone. This feed material mixes with the molten zone changing its solute concentration. This part of the pass is shown in FIG. 9. When the molten zone's freezing interface reaches the tap arm 80, the moving heater 106, reciprocates and starts another pass. The timer 94 shuts off the heater 90 and allows the tap arm to cool. The timer 104 activates the heater 98, thereby melting all of the material in the vertical segment 96. Feed flows down, creates a solid plug in the tap arm 80, and fills the empty portion of the vertical segment 96 with molten feed as shown in FIG. 10. The timer 104 then shuts off the heater 98 to allow the material in the vertical segment 96 to freeze as shown in FIG. 11 with heater 106 on its way up the container 78.

A first approximation of the steady state equations which describe the solute distribution that exits in the enriching sections of the embodiments of this invention is given by the steady state equations for the enriching section of the matter transport system described in the Review of Scientific Instruments, volume 35, page 25

(1964). Each of the embodiments of this invention that has been described has illustrated only one moving heater to perform the zoning operation; however, to decrease the length of time required per pass, additional heaters can be added as is well known in the art.

Thus, there has been shown a system which utilizes matter transport instead of the zone void principle for movement of material along an enriching section. The enriching section may be either horizontal or vertical with an L-shaped feed for the horizontal type and either an J-shaped feed connected to the bottom end of one vertical embodiment or a feed of any shape connected to the to pend of an alternate vertical embodiment. Tap arms and vents are provided to insure the easy removal of the waste material from the system.

The system of this invention allows for the preparation of ultra-pure materials without the need for having a stripping section together with its attendant disadvantages.

Although the invention has been described with reference to particular embodiments, it will be understood to those skilled in the art that the invention is capable of a variety of alternative embodiments within the spirit and scope of the appended claims.

We claim:

1. A continuous zone refining system which utilizes matter transport for material flow comprising:
   a feed containing material to be processed,
   a section for separating product from impurities connected at one end with said feed,
   an outlet at the other end of said section remote from said feed,
   a tap arm connected with said section proximate to the end of said section connected with said feed,
   heating means connected with said feed and said tap arm, timing means for selectively controlling the heating of said feed and said tap arm,
   said feed heating means when inactivated disconnecting communication between the feed and both the tap arm and section, respectively, and
   movable means for causing alternate hot and cold zones to progress along said section.

2. A continuous zone refining system as defined in claim 1 including venting means for aiding in the draining of material from said section.

3. A continuous zone refining system as defined in claim 1 wherein said section is horizontally oriented.

4. A continuous zone refining system as defined in claim 3 wherein said feed is L-shaped.

5. A continuous zone refining system as defined in claim 3 including a vent located proximate to said tap arm.

6. A continuous zone refining system as defined in claim 1 wherein said section is vertically oriented.

7. A continuous zone refining system as defined in claim 6 wherein said feed is connected to the bottom of said section.

8. A continuous zone refining system as defined in claim 6 wherein said feed is connected to the top of said section.

References Cited

UNITED STATES PATENTS

| | | |
|---|---|---|
| 2,962,363 | 11/1960 | Martin. |
| 3,002,821 | 10/1961 | Haron. |
| 3,036,898 | 5/1962 | Brock et al. |
| 3,190,732 | 6/1965 | Hamilton. |
| 3,243,266 | 3/1966 | Moates et al. |
| 3,310,383 | 3/1967 | Kennedy. |

NORMAN YUDKOFF, Primary Examiner

C. P. RIBANDO, Assistant Examiner

U.S. Cl. X.R.

23—301